(12) United States Patent
Chawla et al.

(10) Patent No.: US 10,397,061 B1
(45) Date of Patent: Aug. 27, 2019

(54) LINK BANDWIDTH ADJUSTMENT FOR BORDER GATEWAY PROTOCOL

(71) Applicant: Juniper Networks, Inc., Sunnyvale, CA (US)

(72) Inventors: Nipun Chawla, Bangalore (IN); Himanshu Kumar Tambakuwala, Bangalore (IN); Eduard Schornig, Haarlem (NL)

(73) Assignee: Juniper Networks, Inc., Sunnyvale, CA (US)

( * ) Notice: Subject to any disclaimer, the term of this patent is extended or adjusted under 35 U.S.C. 154(b) by 166 days.

(21) Appl. No.: 15/386,398

(22) Filed: Dec. 21, 2016

(51) Int. Cl.
| | |
|---|---|
| G06F 15/16 | (2006.01) |
| H04L 12/24 | (2006.01) |
| H04L 12/26 | (2006.01) |
| H04L 12/803 | (2013.01) |
| H04L 12/751 | (2013.01) |
| G06F 15/173 | (2006.01) |

(52) U.S. Cl.
CPC ...... *H04L 41/0896* (2013.01); *H04L 43/0894* (2013.01); *H04L 45/02* (2013.01); *H04L 47/125* (2013.01)

(58) Field of Classification Search
CPC .... H04L 67/10; H04L 43/0894; H04L 43/125
USPC ......................................................... 709/231
See application file for complete search history.

(56) References Cited

U.S. PATENT DOCUMENTS

| | | | |
|---|---|---|---|
| 7,660,254 B2 * | 2/2010 | Vasseur ............... | H04L 12/4633 370/231 |
| 8,175,006 B2 | 5/2012 | Lee et al. | |
| 8,954,491 B1 * | 2/2015 | Medved ................ | H04L 45/02 709/201 |
| 9,923,798 B1 * | 3/2018 | Bahadur ................ | H04L 45/00 |
| 10,015,073 B2 * | 7/2018 | Patel ...................... | H04L 45/02 |
| 2005/0068968 A1 * | 3/2005 | Ovadia .................. | H04L 45/04 370/396 |
| 2006/0174035 A1 * | 8/2006 | Tufail .................... | H04L 45/02 709/239 |
| 2006/0268681 A1 * | 11/2006 | Raza ...................... | H04L 45/02 370/216 |

(Continued)

OTHER PUBLICATIONS

Wikipedia, "Stateful firewall," https://en.wikipedia.org/wiki/Stateful_firewall, Dec. 3, 2016, 4 pages.

(Continued)

*Primary Examiner* — Karen C Tang
(74) *Attorney, Agent, or Firm* — Harrity & Harrity, LLP

(57) ABSTRACT

A device may include one or more processors to identify a first bandwidth of a first link and a second bandwidth of a second link that include a first plurality of interfaces and a second plurality of interfaces, respectively. The one or more processors may store a first and a second link bandwidth extended community value identifying the first bandwidth and the second bandwidth, respectively. The one or more processors may determine that the first bandwidth has increased or decreased. The one or more processors may store a modified first link bandwidth extended community value identifying the first bandwidth as increased or decreased. The one or more processors may perform load balancing of network traffic on the first link and the second link based on the modified first link bandwidth extended community value and the second link bandwidth extended community value.

20 Claims, 5 Drawing Sheets

(56) References Cited

U.S. PATENT DOCUMENTS

| | | | | |
|---|---|---|---|---|
| 2008/0130515 | A1* | 6/2008 | Vasseur | H04L 12/4633 370/254 |
| 2011/0134769 | A1* | 6/2011 | Lee | H04L 45/125 370/252 |
| 2013/0041972 | A1* | 2/2013 | Field | H04L 29/08729 709/213 |
| 2015/0146536 | A1* | 5/2015 | Minei | H04L 45/507 370/236 |
| 2015/0249593 | A1* | 9/2015 | Alvarez | H04L 41/0803 370/241 |
| 2016/0080502 | A1* | 3/2016 | Yadav | H04L 63/061 709/227 |
| 2018/0109450 | A1* | 4/2018 | Filsfils | H04L 45/50 |
| 2018/0131604 | A1* | 5/2018 | Zhou | H04L 45/02 |

OTHER PUBLICATIONS

Wikipedia, "Deep packet inspection," https://en.wikipedia.org/wiki/Deep_packet_inspection, Dec. 9, 2016, 11 pages.

Wikipedia, "Firewall (computing)," https://en.wikipedia.org/wiki/Firewall_(computing)#First_generation:_packet_filters, Dec. 20, 2016, 7 pages.

Juniper Networks, "Interprovider VPNs," http://juniper.net/documentation/on/en_US/junos16.1/topics/concept/vpn-interprovider-vpns.html, May 30, 2016, 2 pages.

Wikipedia, "Border Gateway Protocol," https://en.wikipedia.org/wiki/Border_Gateway_Protocol, Dec. 19, 2016, 15 pages.

Wikipedia, "Label Distribution Protocol," https://en.wikipedia.org/wiki/Label_Distribution_Protocol, Jun. 6, 2016, 2 pages.

Wikipedia, "Multiprotocol Label Switching," https://en.wikipedia.org/wiki/Multiprotocol_Label_Switching#Label-switched_path, Dec. 21, 2016, 9 pages.

Wikipedia, "Autonomous system (Internet)," https://en.wikipedia.org/wiki/Autonomous_system_(Internet), Dec. 6, 2016, 3 pages.

P. Mohpatra et al., "BGP Link Bandwidth Extended Community," https://tools.ietf.org/html/draft-ietf-idr-link-bandwidth-06, Jan. 22, 2013, 6 pages.

Lapukhov et al., "Use of BGP for Routing in Large-Scale Data Centers," https://tools.ietf.org/html/rfc7938, Aug. 2016, 35 pages.

* cited by examiner

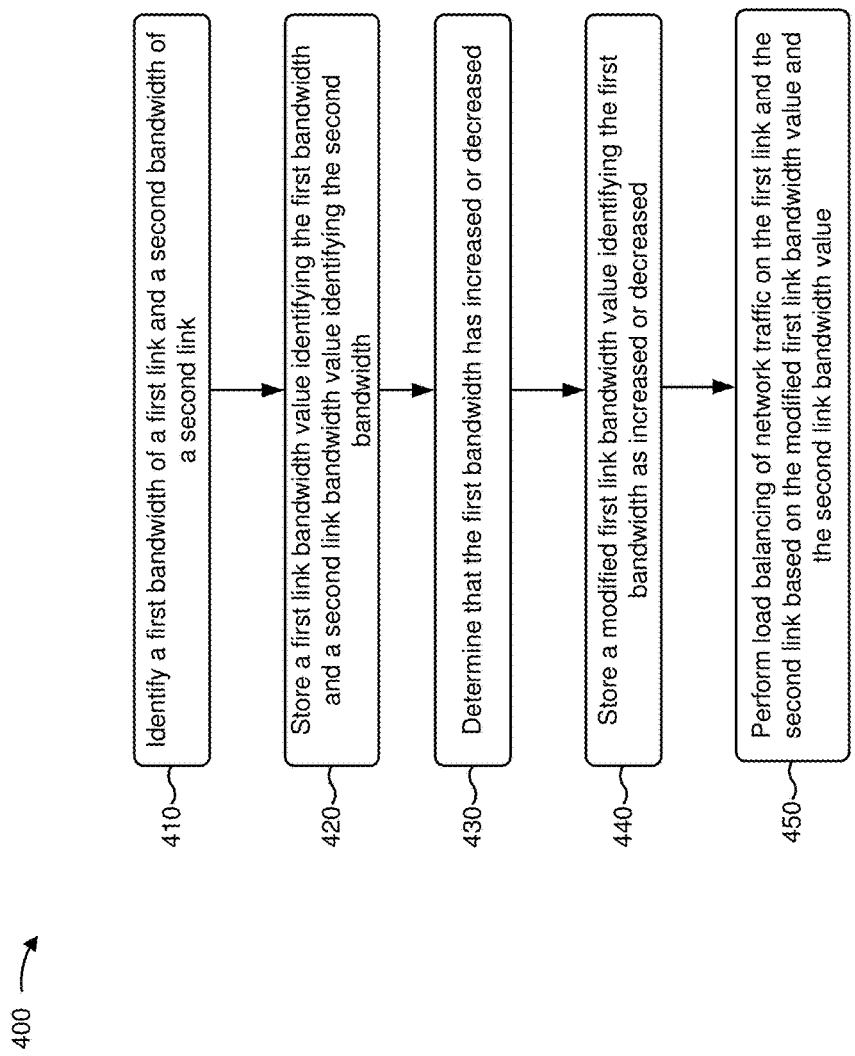

LINK BANDWIDTH ADJUSTMENT FOR BORDER GATEWAY PROTOCOL

BACKGROUND

Border Gateway Protocol (BGP) is a standardized exterior gateway protocol designed to exchange routing and reachability information among autonomous systems (AS) on the Internet. An autonomous system, in the context of BGP, is a collection of connected Internet Protocol (IP) routing prefixes under the control of one or more network operators on behalf of a single administrative entity or domain. An autonomous system may present a common, clearly defined routing policy to the Internet. A network path from one autonomous system to another autonomous system may be referred to as a link. Multiple links may exist between one autonomous system and another autonomous system, and network traffic may be load balanced across the multiple links in some cases.

SUMMARY

A device may include one or more processors to identify a first bandwidth of a first link and a second bandwidth of a second link. The first link and the second link may include a first plurality of interfaces and a second plurality of interfaces, respectively. The one or more processors may store a first link bandwidth extended community value identifying the first bandwidth and a second link bandwidth extended community value identifying the second bandwidth. The first link bandwidth extended community value and the second link bandwidth extended community value may be defined by a border gateway protocol. The one or more processors may determine that the first bandwidth has increased or decreased. The one or more processors may store a modified first link bandwidth extended community value identifying the first bandwidth as increased or decreased. The one or more processors may perform load balancing of network traffic on the first link and the second link based on the modified first link bandwidth extended community value and the second link bandwidth extended community value.

BRIEF DESCRIPTION OF THE DRAWINGS

FIG. 4 is a flow chart of an example process for performing dynamic load balancing of network traffic.

DETAILED DESCRIPTION

Figure 1A:
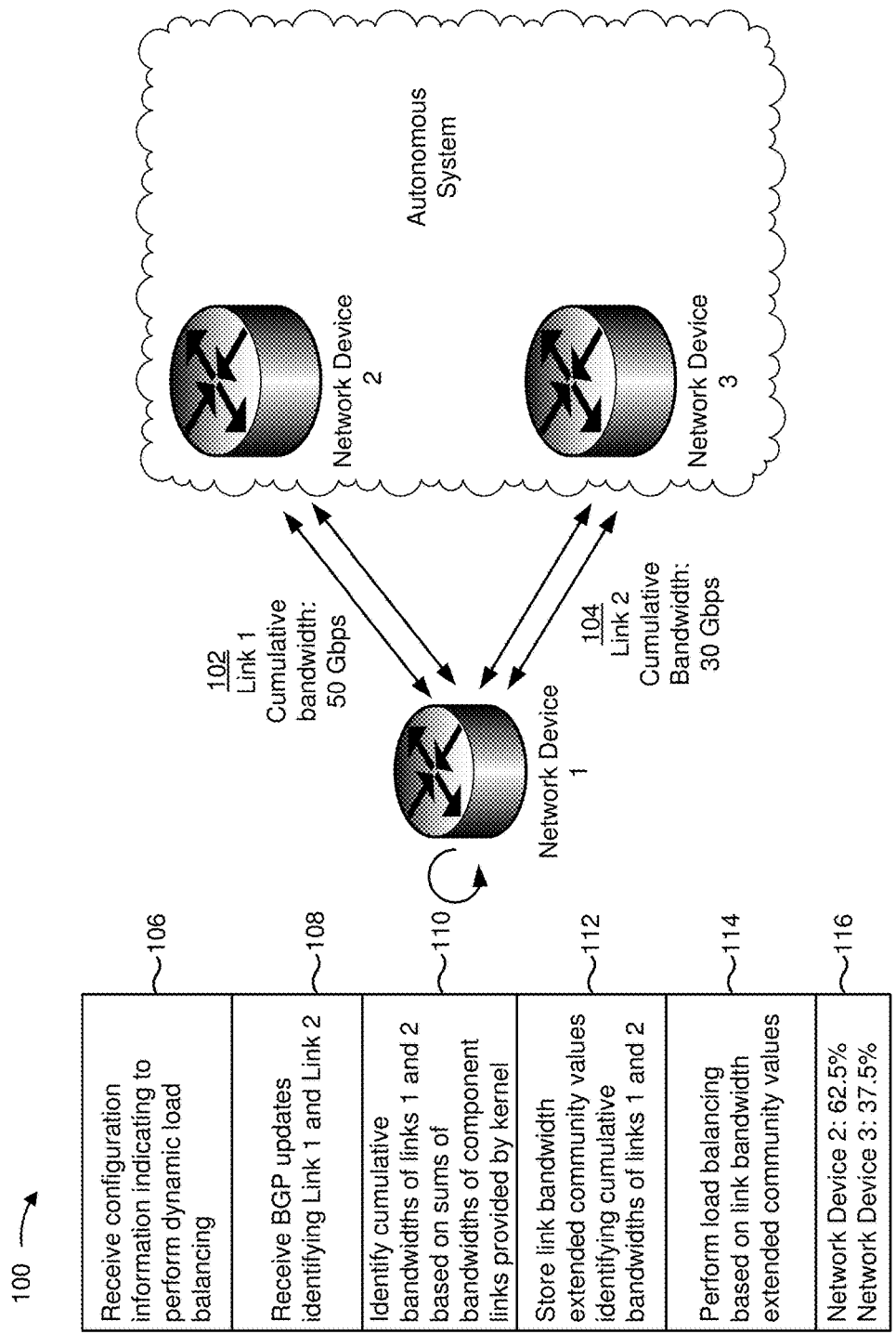
FIGS. 1A and 1B are diagrams of an overview of an example implementation described herein.

The following detailed description of example implementations refers to the accompanying drawings. The same reference numbers in different drawings may identify the same or similar elements.

Network traffic may be routed from an originating set of network devices (e.g., associated with an autonomous system) to a recipient set of network devices or autonomous system based on a routing protocol, such as BGP. The originating set of network devices may identify a bandwidth of each link between the originating set of network devices and the recipient set of network devices. For example, a kernel of the originating set of network devices may identify the bandwidth of each link based on a routing policy or routing table of the originating set of network devices, and may provide information identifying the bandwidth to a routing protocol of the originating set of network devices. The originating set of network devices may store information identifying the bandwidths (e.g., using a link bandwidth extended community value, as defined by BGP), which may permit load balancing of network traffic across each link. As used herein, an extended community value is a property associated with an autonomous system, as defined by BGP. Extended community values may relate to various properties, which may be identified by a prefix or value of the extended community values. A link bandwidth extended community value, for example, may identify a bandwidth of a link to an autonomous system, and may use a particular quantity of bytes to identify the bandwidth, such as 8 bytes, in one example.

When a bandwidth of a link between two autonomous systems (e.g., sets of network devices) changes, the link bandwidth extended community value may not be automatically reconfigured to reflect the changed bandwidth. For example, a link bandwidth may change based on one or more interfaces of an aggregate link being activated or deactivated. A link bandwidth may also change based on a link being switched from one interface to another interface that is associated with a different bandwidth. This may lead to inefficient and/or inaccurate load balancing of network traffic via the link.

Implementations described herein may reconfigure or update link bandwidth information for a link based on a changed bandwidth of the link. For example, implementations described herein may update a value of a link bandwidth extended community (e.g., as defined by BGP) based on kernel information (e.g., information received from a kernel or obtained from a kernel by a routing protocol) identifying a changed bandwidth of the link. In some cases, implementations described herein may reconfigure the link bandwidth information for aggregate links that include multiple different interfaces between a pair of autonomous systems. For example, as interfaces are added or removed and/or as bandwidth changes, the link bandwidth extended community value for an aggregate link may be updated.

Additionally, or alternatively, implementations described herein may update a link bandwidth extended community value based on a reference bandwidth value. For example, a link bandwidth extended community may be capable of storing a particular size of link bandwidth extended community value (e.g., 4 bytes, 8 bytes, or the like). The reference bandwidth value may identify a link bandwidth extended community value, and the link bandwidth extended community may be scaled based on the reference bandwidth value.

By dynamically and automatically reconfiguring link bandwidth information, implementations described herein may improve load balancing in situations where link bandwidth is likely to vary (e.g., for aggregate links). By using reference bandwidth values to scale link bandwidth values, implementations described herein can process higher-bandwidth links and conserve processor resources that would otherwise be used to process larger link bandwidth extended community values.

Figure 1B:
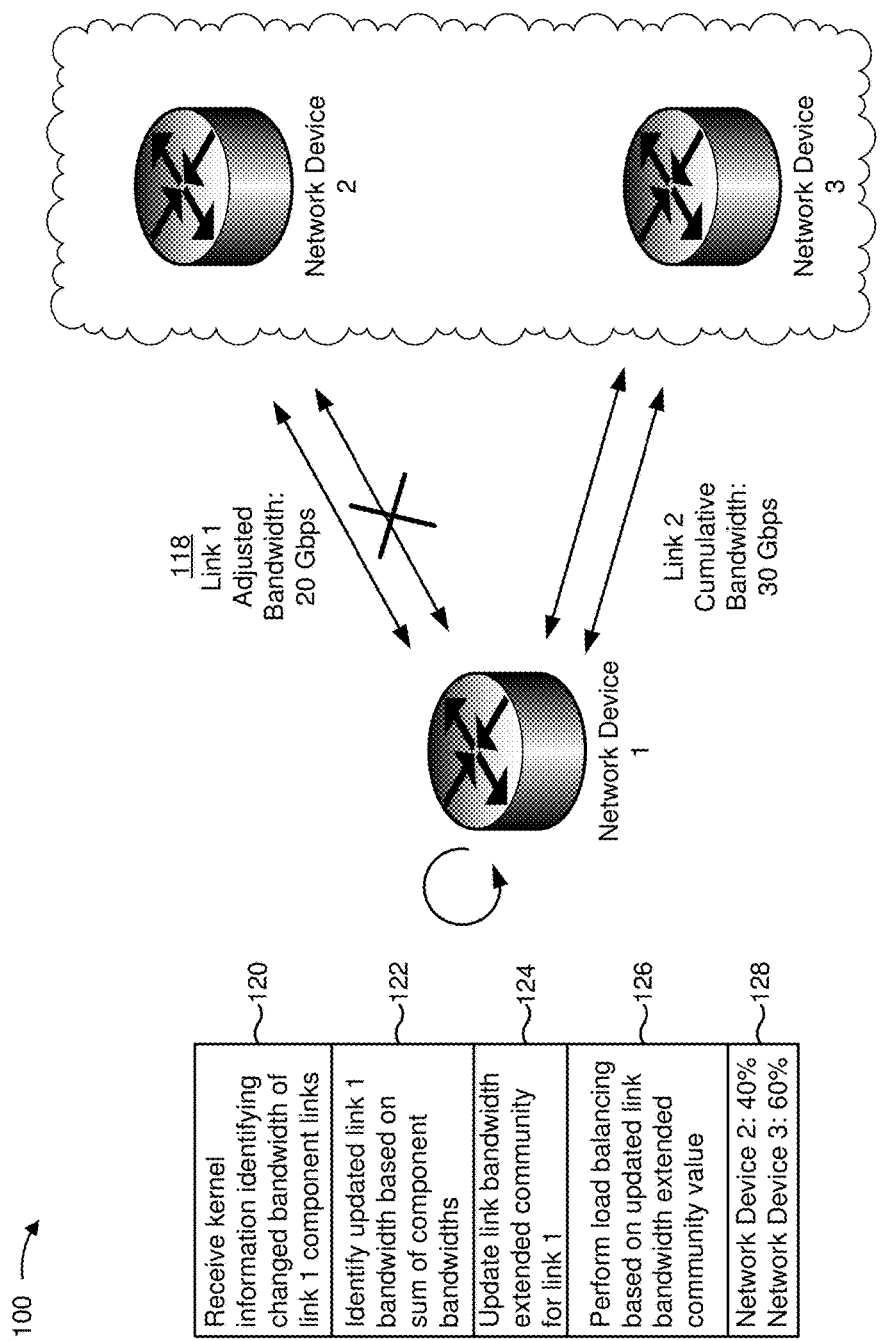

FIGS. 1A and 1B are diagrams of an overview of an example implementation 100 described herein. Example implementation 100 includes network device 1, network device 2, and network device 3. Network device 2 and network device 3 may form part of an autonomous system. In some implementations, network device 1 may form part of an autonomous system that is different from the autonomous system of network device 2 and network device 3. Network device 1 exchanges traffic with network device 2 via link 1, which may include one or more interfaces (shown in FIG. 1A by two arrows). Network device 1 exchanges traffic with network device 3 via link 2, which may include one or more interfaces (shown in FIG. 1A by two arrows).

As shown in FIG. 1A, and by reference number 102, link 1 may be associated with a cumulative bandwidth of 50 gigabits per second (Gbps). As shown by reference number 104, link 2 may be associated with a cumulative bandwidth of 30 Gbps. The cumulative bandwidth for link 2 is 30 Gbps. Thus, the total cumulative bandwidth for link 1 and link 2 equals 80 Gbps.

As shown by reference number 106, network device 1 may receive configuration information indicating that network device 1 is to perform dynamic load balancing for network traffic on link 1 and link 2. As used herein, dynamic load balancing refers to the process of updating link bandwidth values of links between autonomous systems, and reconfiguring load balancing across the links based on the updated link bandwidth values. The configuration information may be received as part of a network configuration, or may be determined by network device 1 (e.g., based on the bandwidth of link 1 changing or the bandwidth of link 2 changing, based on link 1 or link 2 being an aggregate link, or the like). For example, the configuration information may include a routing policy indicating to update link bandwidth information associated with link 1 or link 2 as the bandwidths associated with link 1 and/or link 2 change.

As shown by reference number 108, network device 1 may receive BGP updates identifying link 1 and link 2. For example, link 1 and link 2 may be aggregate bundle links that each include a respective plurality of links. Network device 1 may receive one or more BGP updates for link 1 and link 2. Each BGP update may have a prefix identifying the destination device or autonomous system, and may include next hop information identifying a corresponding link.

As shown by reference number 110, network device 1 may identify a cumulative bandwidth of link 1 and a cumulative bandwidth of link 2 based on sums of bandwidths of the component links of link 1 and link 2. Network device 1 may identify bandwidths of the component links of link 1 and link 2 based on a kernel information or information received from a kernel of network device 1. For example, the kernel may determine the bandwidths of the component links of link 1 and link 2 using any method known in the art, and may provide information identifying the bandwidths to a routing protocol of network device 1. In some implementations, the routing protocol may perform the load balancing and updating of link bandwidth extended communities described herein. For example, assume that network device 1 identifies bandwidths of the component links of link 1 of 20 Gbps and 30 Gbps, respectively. In that case, network device 1 may determine a sum of 20 Gbps and 30 Gbps to determine the cumulative bandwidth of 50 Gbps. Additionally, or alternatively, network device 1 (e.g., the kernel of network device 1) may probe link 1 and link 2 to determine the bandwidths, may determine the bandwidths based on observing traffic flow on link 1 and link 2, or may perform a similar operation to determine the bandwidths.

As shown by reference number 112, network device 1 may store link bandwidth extended community values identifying the cumulative bandwidth of link 1 and the cumulative bandwidth of link 2. For example, the link bandwidth extended community values may identify network device 2 and network device 3, and may identify the respective bandwidths of 50 Gbps and 30 Gbps. In some implementations, the link bandwidth extended community values identifying the bandwidth of link 1 and the bandwidth of link 2 may be scaled or modified based on a reference bandwidth value, as described in more detail elsewhere herein.

As shown by reference number 114, network device 1 may perform load balancing (e.g., on link 1 and link 2) based on the link bandwidth extended community values. As shown by reference number 116, network device 1 may determine that the 50 Gbps cumulative bandwidth of link 1 represents 62.5% of the total cumulative bandwidth of 80 Gbps, and that the 30 Gbps cumulative bandwidth of link 2 represents 37.5% of the total cumulative bandwidth of 80 Gbps. Network device 1 may provide corresponding portions of the network traffic destined to the autonomous system via link 1 and link 2.

As shown in FIG. 1B, network device 1 may receive information indicating that the bandwidth of one or more of the links of network device 1 has increased or decreased. For example, and as shown by reference number 118, a bandwidth of link 1 has decreased based on a component link of link 1 being deactivated or interrupted (shown as an X on one of the arrows from network device 1 to network device 2). As shown by reference number 120, network device 2 may receive (e.g., determine, obtain, etc.) kernel information indicating that the bandwidth of link 1 has decreased. For example, the kernel may determine that the bandwidth of link 1 has decreased based on the component link being deactivated or interrupted, and may provide information identifying the adjusted bandwidth of link 1 to one or more components of network device 1 (e.g., a routing protocol component, etc.). As shown, a cumulative bandwidth of link 2 remains at 30 Gbps. Thus, the total updated cumulative bandwidth for link 1 and link 2 equals 50 Gbps.

As shown by reference number 122, network device 1 may identify the updated link 1 bandwidth of 20 Gbps for link 1 based on the kernel information. As shown by reference number 124, network device 1 may update the link bandwidth extended community value for link 1 to identify the updated link 1 bandwidth of 20 Gbps. Thus, network device 1 enables reconfiguration or updating of load balancing parameters based on changing bandwidths of aggregate links.

As shown by reference number 126, network device 1 may perform load balancing of link 1 and link 2 based on the updated link bandwidth extended community value for link 1. For example, and as shown by reference number 128, network device 1 may determine that the 20 Gbps cumulative bandwidth of link 1 represents 40% of the total cumulative bandwidth of 50 Gbps, and that the 30 Gbps cumulative bandwidth of link 2 represents 60% of the total cumulative bandwidth of 50 Gbps, and may provide corresponding portions of the network traffic en route to the autonomous system via link 1 and link 2.

In this way, the link bandwidth extended communities identifying the bandwidths of link 1 and link 2 are dynamically (e.g., continuously, iteratively, etc.) updated based on changing bandwidths of link 1 and/or link 2. By dynamically updating the link bandwidth extended communities, implementations described herein may improve load balancing in situations where link bandwidth is likely to vary. By scaling the link bandwidth extended community values identifying the bandwidth of link 1 and the bandwidth of link 2 based on a reference bandwidth value, network device 1 may process higher-bandwidth links and conserve processor resources that would otherwise be used to process larger link bandwidth extended community values.

As indicated above, FIGS. 1A and 1B are provided merely as an example. Other examples are possible and may differ from what was described with regard to FIGS. 1A and 1B.

Figure 2:
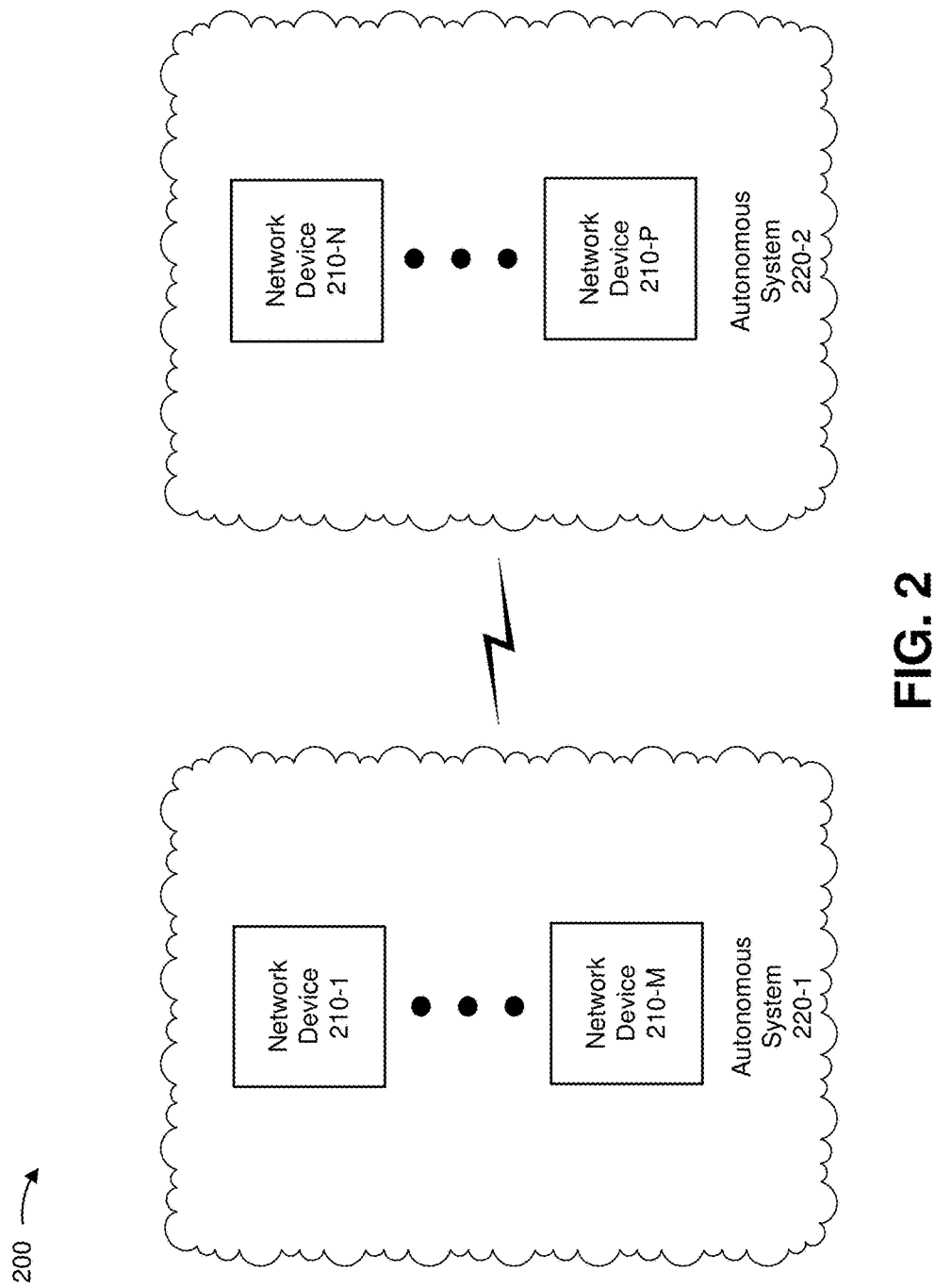
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include network devices 210-1 through 210-P (P≥1) (hereinafter referred to collectively as "network devices 210," and individually as "network device 210") and autonomous systems 220. Devices of environment 200 may interconnect via wired connections, wireless connections, or a combination of wired and wireless connections.

Network device 210 includes one or more devices (e.g., one or more traffic transfer devices) capable of processing and/or transferring traffic between endpoint devices. For example, network device 210 may include a firewall, a router, a gateway, a switch, a hub, a bridge, a reverse proxy, a server (e.g., a proxy server), a security device, an intrusion detection device, a load balancer, or a similar device.

Autonomous system 220 includes one or more network devices 210 associated with a set of connected IP routing prefixes. Autonomous system 220 may be operated by (e.g., controlled by, etc.) one or more network operators (e.g., associated with one or more network devices 210) on behalf of a single administrative entity or domain. Autonomous system 220 may present or provide a common routing policy to devices or networks external from autonomous system 220, such as other autonomous systems 220 and/or network devices 210. As shown, autonomous system 220-1 may include one or more network devices 210. For example, autonomous system 220-1 and 220-1 may include a single network device 210 or multiple network devices 210.

The number and arrangement of devices and systems shown in FIG. 2 are provided as an example. In practice, there may be additional devices and/or systems, fewer devices and/or systems, different devices and/or systems, or differently arranged devices and/or systems than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
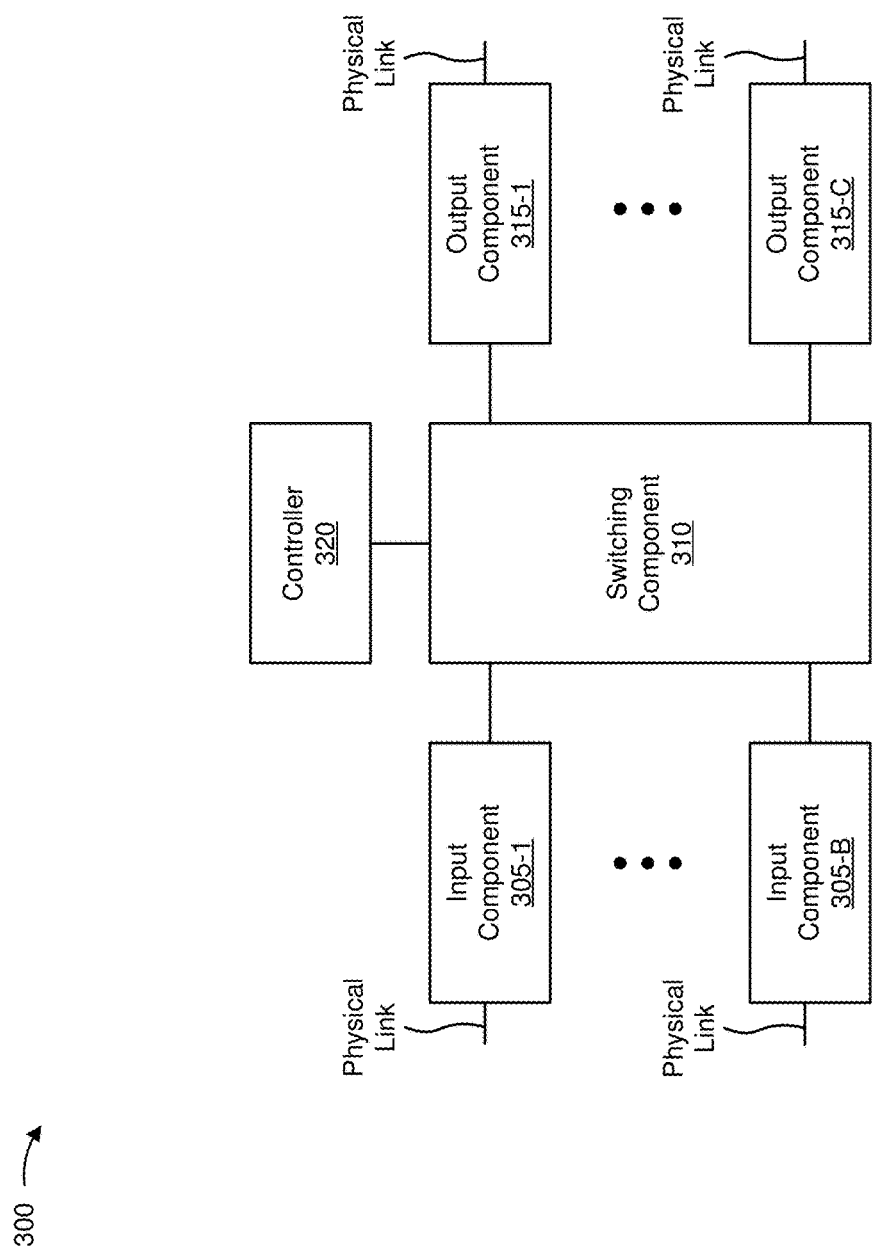
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing dynamic load balancing of network traffic. In some implementations, one or more process blocks of FIG. 4 may be performed by network device 210.

As shown in FIG. 4, process 400 may include identifying a first bandwidth of a first link and a second bandwidth of a second link (block 410). For example, originating network device 210 may identify a first bandwidth of a first link and a second bandwidth of a second link. In some implementations, originating network device 210 may be included in a first autonomous system 220, and the first link and the second link may include links and/or interfaces to a second autonomous system 220. The second autonomous system 220 may include one or more recipient network devices 210.

In some implementations, the first link and/or the second link may include multiple, different interfaces between the first autonomous system 220 and the second autonomous system 220. For example, a link may include an aggregate bundle of multiple, different interfaces. One or more interfaces of a link may be established, torn down, or modified during operation of the first autonomous system 220 and/or the second autonomous system 220. In this case, the first bandwidth and/or the second bandwidth may increase or decrease as the one or more interfaces are established, torn down, or modified.

Additionally, or alternatively, the first bandwidth and/or the second bandwidth may increase or decrease based on a path of a link being switched from a first interface to a second interface. For example, a first path may be associated with a 10 Gbps interface, and a second path may be associated with a 100 Gbps interface. In this example, when the path is switched (e.g., based on an outage of the first path, a load of the first path, an insufficient bandwidth of the first path, or the like), the bandwidth of the link may change from 10 Gbps to 100 Gbps.

In these cases, when originating network device 210 is not configured to dynamically update link bandwidth values (e.g., link bandwidth extended community values) associated with the first link and/or the second link, originating network device 210 may continue to load balance traffic between the first link and the second link based on an inaccurate (e.g., outdated) bandwidth value. This may lead to wasted network resources, dropped traffic, delay, or the like.

In some implementations, originating network device 210 may calculate a bandwidth value associated with a link (e.g., an aggregate link). For example, when a link includes multiple, different interfaces, originating network device 210 may sum the respective bandwidths associated with the multiple, different interfaces to determine a bandwidth of the link. In some implementations, originating network device 210 may identify the respective bandwidths based on a kernel of originating network device 210. The kernel may determine the respective bandwidths using any method known in the art, and may provide information identifying the respective bandwidths to one or more components of originating network device 210, such as a routing protocol component, or the like. In some implementations, originating network device 210 may identify the respective bandwidths based on receiving a BGP update identifying recipient network device 210, based on probing the multiple, different interfaces, based on measuring an observed bandwidth on the multiple, different interfaces, or the like.

As further shown in FIG. 4, process 400 may include storing a first link bandwidth value identifying the first bandwidth and a second link bandwidth value identifying the second bandwidth (block 420). For example, originating network device 210 may store a first link bandwidth value identifying the first bandwidth and a second link bandwidth value identifying the second bandwidth. The first link bandwidth value may identify the bandwidth of the first link, and the second link bandwidth value may identify the bandwidth of the second link. In some implementations, when the one or more recipient network devices 210 use BGP to route network traffic, the link bandwidth values may be stored using link bandwidth extended community values that identify the one or more recipient network devices 210, the autonomous system 220 (e.g., the second autonomous system), and/or the bandwidth of the corresponding link.

In some implementations, originating network device 210 may store the first link bandwidth value and the second link bandwidth value based on configuration information indicating that the first link bandwidth value and the second link bandwidth value are to be updated as the first bandwidth and/or the second bandwidth change. For example, configuration information of originating network device 210 may include a routing policy extended community value indicating that the first link bandwidth value and/or the second link bandwidth value are to be updated. As a more particular example, the routing policy may include "set policy-options community bw-cal members bandwidth:65000: dynamic", where "set policy-options community" identifies the string as a routing policy extended community value, "bw-cal members bandwidth:65000" identifies an autonomous system 220 with an identifier of 65000, and "dynamic" indicates that a link bandwidth extended community value associated with the identified autonomous system 220 is to be dynamically updated.

In some implementations, originating network device 210 may store a link bandwidth value that is modified based on a reference bandwidth value. For example, originating network device 210 may be capable of storing link bandwidth values that are smaller than or equal to a particular size (e.g., 4 bytes, 8 bytes, or the like). As link bandwidth increases, an increasing number of links may exceed the particular size allotted for the link bandwidth value (e.g., a particular size allotted in memory). In such a case, the reference bandwidth value may permit originating network device 210 to modify the link bandwidth values of the first link and/or the second link so that originating network device 210 can store the link bandwidth values using the memory allotted to storing link bandwidth values.

In some implementations, the reference bandwidth value may be set based on a minimum bandwidth of a link or a minimum bandwidth of an interface of a link. For example, assume that a first link includes three interfaces of 10 Gbps each, for a cumulative bandwidth of 30 Gbps, and that a second link includes one interface of 100 Gbps, for a cumulative bandwidth of 100 Gbps. In that case, the reference bandwidth value may be set to 10 Gbps (e.g., based on a smallest interface bandwidth value of the first link and the second link), and the bandwidth values of the first link and the second link may be scaled to 3 and 10, respectively (e.g., according to the operations 30 Gbps/10 Gbps and 100 Gbps/10 Gbps). Thus, storage resources are conserved that would otherwise be used to store unmodified link bandwidth values.

In some implementations, the reference bandwidth value may be set based on a maximum link bandwidth value. For example, in the above example, the reference bandwidth value may be set to 100 Gbps (e.g., based on a largest interface bandwidth value of the first link and the second link), and the link bandwidth values may be scaled to 0.3 and 1, respectively (e.g., 30 Gbps/100 Gbps and 100 Gbps/100 Gbps). Thus, storage resources are conserved that would otherwise be used to store unmodified link bandwidth values.

In some implementations, originating network device 210 may determine the reference bandwidth value (e.g., based on a minimum or maximum link bandwidth value). In this way, the reference bandwidth value may be determined based on current link bandwidth conditions, thereby permitting more efficient scaling of the link bandwidth values. In some implementations, originating network device 210 may receive information identifying the reference bandwidth value. For example, originating network device 210 may receive information identifying the reference bandwidth value as part of a routing policy community value during a configuration process of originating network device 210. In this way, originating network device 210 resources are conserved that would otherwise be used to determine the reference bandwidth value.

As further shown in FIG. 4, process 400 may include determining that the first bandwidth has increased or decreased (block 430). For example, originating network device 210 may determine that, or may receive information indicating that, the first bandwidth of the first link has increased or decreased. Additionally, or alternatively, originating network device 210 may receive information indicating that the second bandwidth of the second link has increased or decreased. In some implementations, originating network device 210 (e.g., a routing protocol component of originating network device 210) may receive the information indicating that the first bandwidth has increased or decreased from a kernel of originating network device 210. For example, the kernel may determine that the first bandwidth has increased or decreased, and may provide information identifying an updated value of the first bandwidth to other components of originating network device 210, such as a routing protocol component, or the like.

Notably, while implementations described herein are primarily described with regard to changes in the first bandwidth for the sake of simplicity, implementations described herein are not limited to cases wherein only one bandwidth of the first link and/or one bandwidth of the second link changes. For example, a bandwidth of only the second link may change, or a bandwidth of only the first link may change, or a bandwidth of both links may change. Also, implementations described herein are not limited to a case with two links between autonomous systems 220. For example, implementations described herein are equally applicable when there are three or more links between autonomous systems 220.

In some implementations, originating network device 210 may determine that the bandwidth of the first link has changed. For example, originating network device 210 may probe the first link to determine that the bandwidth has changed, may determine that traffic on the first link has been dropped or delayed, may determine an observed bandwidth of the first link based on traffic provided via the first link, or the like.

As further shown in FIG. 4, process 400 may include storing a modified first link bandwidth value identifying the first bandwidth as increased or decreased (block 440). For example, originating network device 210 may store a modified first link bandwidth value identifying the first bandwidth as increased or decreased. In some implementations, originating network device 210 may store a modified first link bandwidth value identifying a modified value of the first bandwidth. Additionally, or alternatively, originating network device 210 may modify a stored first link bandwidth value associated with the first link. For example, when originating network device 210 uses BGP as the routing protocol, originating network device 210 may store a modified value, or modify a stored value, of a link bandwidth extended community value for the first link.

In some implementations, originating network device 210 may scale the modified first link bandwidth value based on a reference bandwidth value, as described in more detail above. In this way, originating network device 210 may determine the reference bandwidth value based on current link bandwidth conditions, thereby permitting more efficient scaling of link bandwidth values.

As further shown in FIG. 4, process 400 may include performing load balancing of network traffic on the first link and the second link based on the modified first link bandwidth value and the second link bandwidth value (block 450). For example, originating network device 210 may perform load balancing of network traffic on the first link and the second link based on the modified first link bandwidth value and the second bandwidth value. In some implementations, originating network device 210 may use a ratio of the modified first link bandwidth value and the second link bandwidth value to determine relative quantities of the network traffic to be provided on each link, and may provide the relative quantities of the network traffic on each link.

In some implementations, originating network device 210 may route higher-priority or higher-bandwidth traffic via a higher-bandwidth link, and may route lower-priority or lower-bandwidth traffic (e.g., relative to the higher-priority or higher-bandwidth traffic) via a lower-bandwidth link. In this way, originating network device 210 reduces delay, dropped traffic, and bandwidth constriction of the higher-priority or higher-bandwidth traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the link bandwidth extended communities identifying the bandwidths of the first link and the second link are dynamically updated based on changing bandwidths of the first link and/or the second link. By updating the link bandwidth extended communities, implementations described herein improve load balancing in situations where link bandwidth is likely to vary. By scaling the link bandwidth extended community values identifying the bandwidth of link 1 the first link and the bandwidth of the second link based on a reference bandwidth value, a network device can process higher-bandwidth links and conserve processor resources that would otherwise be used to process larger link bandwidth extended community values.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The invention claimed is:

1. A device, comprising:
   one or more memories; and
   one or more processors, communicatively coupled to the one or more memories, to:
      identify a first bandwidth of a first link and a second bandwidth of a second link,
         the first link and the second link comprising a first plurality of interfaces and a second plurality of interfaces, respectively, and
         the one or more processors, when identifying the first bandwidth and the second bandwidth, are to:
            determine, based on a routing table, a first sum of bandwidths of the first plurality of interfaces as the first bandwidth; and
            determine, based on the routing table, a second sum of bandwidths of the second plurality of interfaces as the second bandwidth;
      store a first link bandwidth extended community value identifying the first bandwidth and a second link bandwidth extended community value identifying the second bandwidth,
         the first link bandwidth extended community value and the second link bandwidth extended community value being defined by a border gateway protocol;
      determine that the first bandwidth has increased or decreased based on information received from a kernel of the device;
      store a modified first link bandwidth extended community value identifying the first bandwidth as increased or decreased; and
      perform load balancing of network traffic on the first link and the second link based on the modified first link bandwidth extended community value and the second link bandwidth extended community value.

2. The device of claim 1, where the one or more processors, when determining that the first bandwidth has increased or decreased, are to:
   determine that the first bandwidth has increased or decreased based on the first link being switched from a first path to a second path,
      the second path having a different bandwidth than the first path.

3. The device of claim 1, where the one or more processors, when storing the modified first link bandwidth extended community value identifying the first bandwidth as increased or decreased, are to:
   store the modified first link bandwidth extended community value based on configuration information indicating that the first link bandwidth extended community value is to be updated if the first bandwidth changes.

4. The device of claim 1, where the one or more processors are further to:
   receive information identifying a reference bandwidth value; and
   where the one or more processors, when storing the first link bandwidth extended community value and the second link bandwidth extended community value, are to:
      modify values of the first bandwidth and the second bandwidth based on the reference bandwidth value to determine the first link bandwidth extended community value and the second link bandwidth extended community value; and
   where the one or more processors, when storing the modified first link bandwidth extended community value, are to:
      modify a value of the first bandwidth as increased or decreased based on the reference bandwidth value to determine the modified first link bandwidth extended community value.

5. The device of claim 1, where the one or more processors are further to:
   determine a ratio of the modified first link bandwidth extended community value and the second link bandwidth extended community value; and
   where the one or more processors, when performing load balancing of the network traffic, are to:
      perform load balancing of the network traffic based on the ratio.

6. The device of claim 1, where the one or more processors are further to:
  probe traffic associated with the first link; and
  determine, based on probing the traffic associated with the first link, whether the traffic associated with the first link has been dropped,
  where the one or more processors, when determining that the first bandwidth has increased or decreased, are to:
    determine that the first bandwidth has increased or decreased based on whether the traffic associated with the first link has been dropped.

7. The device of claim 1, where the one or more processors are further to:
  observe traffic associated with the first link; and
  determine, based on observing the traffic associated with the first link, whether the traffic associated with the first link has been delayed,
  where the one or more processors, when determining that the first bandwidth has increased or decreased, are to:
    determine that the first bandwidth has increased or decreased based on whether the traffic associated with the first link has been delayed.

8. A non-transitory computer-readable medium storing instructions, the instructions comprising:
  one or more instructions that, when executed by one or more processors of a device, cause the one or more processors to:
    receive information identifying a first bandwidth of a first link and a second bandwidth of a second link, and
      the one or more instructions, when identifying the first bandwidth and the second bandwidth, cause the one or more processors to:
        determine, based on a routing table, a first sum of bandwidths as the first bandwidth; and
        determine, based on the routing table, a second sum of bandwidths as the second bandwidth;
    store a first link bandwidth extended community value identifying the first bandwidth and a second link bandwidth extended community value identifying the second bandwidth,
      the first link bandwidth extended community value and the second link bandwidth extended community value being defined based on border gateway protocol;
    determine that the first bandwidth has increased or decreased based on information received from a kernel of the device;
    modify the first link bandwidth extended community value to identify the first bandwidth as increased or decreased; and
    perform load balancing of network traffic on the first link and the second link based on the modified first link bandwidth extended community value and the second link bandwidth extended community value.

9. The non-transitory computer-readable medium of claim 8, where the one or more instructions, when executed by the one or more processors, further cause the one or more processors to:
  receive information identifying a reference bandwidth value; and
  where the one or more instructions, that cause the one or more processors to store the first link bandwidth extended community value and the second link bandwidth extended community value, cause the one or more processors to:
    modify values of the first bandwidth and the second bandwidth based on the reference bandwidth value to determine the first link bandwidth extended community value and the second link bandwidth extended community value.

10. The non-transitory computer-readable medium of claim 8, where the one or more instructions, that cause the one or more processors to determine that the first bandwidth has increased or decreased, cause the one or more processors to:
  determine that the first bandwidth has increased or decreased based on the first link being switched from a first path to a second path,
    the second path having a different bandwidth than the first path.

11. The non-transitory computer-readable medium of claim 8, where the first link includes a first plurality of interfaces and the second link includes a second plurality of interfaces.

12. The non-transitory computer-readable medium of claim 8, where the one or more instructions, that cause the one or more processors to modify the first link bandwidth extended community value, cause the one or more processors to:
  modify the first link bandwidth extended community value based on configuration information indicating that the first link bandwidth extended community value is to be dynamically updated.

13. The non-transitory computer-readable medium of claim 8, where the one or more instructions, that cause the one or more processors to receive the information identifying the first bandwidth of the first link and the second bandwidth of the second link, cause the one or more processors to:
  receive one or more border gateway protocol updates identifying the first link and the second link; and
  identify the first bandwidth and the second bandwidth based on receiving the one or more border gateway protocol updates.

14. The non-transitory computer-readable medium of claim 8, where the one or more instructions, when executed by the one or more processors, further cause the one or more processors to:
  observe traffic associated with the first link; and
  determine, based on observing the traffic associated with the first link, whether the traffic associated with the first link has been delayed,
  where the one or more instructions, that cause the one or more processors to determine that the first bandwidth has increased or decreased, cause the one or more processors to:
    determine that the first bandwidth has increased or decreased based on whether the traffic associated with the first link has been delayed.

15. A method, comprising:
  determining, by a device, information identifying a first bandwidth of a first link and a second bandwidth of a second link,
    the first link including a plurality of interfaces, and
    determining information identifying the first bandwidth and the second bandwidth comprises:
      determining, based on a routing table, a first sum of bandwidths as the first bandwidth; and
      determining, based on the routing table, a second sum of bandwidths as the second bandwidth;
  storing, by the device, a first link bandwidth extended community value identifying the first bandwidth and a second link bandwidth extended community value identifying the second bandwidth, the first link bandwidth extended community value and the second link bandwidth extended community value being defined based on border gateway protocol;

receiving, by the device, information indicating that the first bandwidth has increased or decreased based on failure or establishment of one or more of the plurality of interfaces;

modifying, by the device, the first link bandwidth extended community value to identify the first bandwidth as increased or decreased based on information received from a kernel of the device; and performing, by the device, load balancing of network traffic on the first link and the second link based on the modified first link bandwidth extended community value and the second link bandwidth extended community value.

16. The method of claim 15, further comprising:

receiving or determining information identifying a reference bandwidth value; and where storing the first link bandwidth extended community value and the second link bandwidth extended community value comprises:

modifying values of the first bandwidth and the second bandwidth based on the reference bandwidth value to determine the first link bandwidth extended community value and the second link bandwidth extended community value.

17. The method of claim 15, where modifying the first link bandwidth extended community value comprises:

modifying the first link bandwidth extended community value based on configuration information indicating that the first link bandwidth extended community value is to be dynamically updated.

18. The method of claim 15, where the plurality of interfaces is a first plurality of interfaces; and where the second link is associated with a second plurality of interfaces that is different than the first plurality of interfaces.

19. The method of claim 15, where determining the information identifying the first bandwidth of the first link and the second bandwidth of the second link comprises:

receiving one or more border gateway protocol (BGP) updates corresponding to the first link and the second link; and identifying the first bandwidth and the second bandwidth based on receiving the one or more BGP updates.

20. The method of claim 15, further comprising:

probing traffic associated with the first link; and determining, based on probing the traffic associated with the first link, whether the traffic associated with the first link has been dropped, where determining that the first bandwidth has increased or decreased comprises:

determining that the first bandwidth has increased or decreased based on whether the traffic associated with the first link has been dropped.

* * * * *